United States Patent
Roy

(10) Patent No.: US 10,142,998 B2
(45) Date of Patent: Nov. 27, 2018

(54) GATEWAY DIVERSITY OPERATION IN A SATELLITE NETWORK

(71) Applicant: HUGHES NETWORK SYSTEMS, LLC, Germantown, MD (US)

(72) Inventor: Satyajit Roy, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 16 days.

(21) Appl. No.: 15/169,126

(22) Filed: May 31, 2016

(65) Prior Publication Data

US 2017/0347363 A1    Nov. 30, 2017

(51) Int. Cl.
| | |
|---|---|
| H04W 72/08 | (2009.01) |
| H04B 7/185 | (2006.01) |
| H04W 8/04 | (2009.01) |
| H04W 28/02 | (2009.01) |
| H04W 72/04 | (2009.01) |
| H04W 36/30 | (2009.01) |
| H04W 88/02 | (2009.01) |
| H04W 88/16 | (2009.01) |
| H04W 88/06 | (2009.01) |
| H04W 84/06 | (2009.01) |

(52) U.S. Cl.
CPC ...... *H04W 72/087* (2013.01); *H04B 7/18528* (2013.01); *H04W 8/04* (2013.01); *H04W 28/0268* (2013.01); *H04W 36/30* (2013.01); *H04W 72/046* (2013.01); *H04W 28/0231* (2013.01); *H04W 84/06* (2013.01); *H04W 88/02* (2013.01); *H04W 88/16* (2013.01)

(58) Field of Classification Search
CPC ... H04W 72/087; H04W 8/04; H04W 72/046; H04W 28/0268; H04W 88/16; H04W 88/02; H04B 7/18528
See application file for complete search history.

(56) References Cited

U.S. PATENT DOCUMENTS

| | | | | |
|---|---|---|---|---|
| 7,599,657 B2* | 10/2009 | Schiff | ................ | H04B 7/18534 455/12.1 |
| 7,630,339 B2* | 12/2009 | Laroia | ................ | H04B 7/0626 370/330 |
| 8,320,301 B2* | 11/2012 | Walton | ................ | H04B 7/022 370/328 |
| 9,955,513 B2* | 4/2018 | Kim | ................ | H04W 76/10 |
| 2012/0224484 A1* | 9/2012 | Babiarz | ................ | H04L 41/5019 370/235 |
| 2017/0164416 A1* | 6/2017 | Yeddala | ................ | H04W 36/30 |

* cited by examiner

*Primary Examiner* — Andrew Lai
*Assistant Examiner* — Harry H Kim
(74) *Attorney, Agent, or Firm* — Nath, Goldberg & Meyer; Leonid D. Thenor

(57) ABSTRACT

A method and system for selectively using different gateways with a diverse terminal includes assigning a diverse channel set to each of a plurality of diverse terminals, and designating a primary gateway and a secondary gateway as either a home gateway or a foreign gateway for the each diverse terminal. During normal operations, link conditions for the channel between each diverse terminal and its home gateway are monitored. Diverse terminals can be reconfigured to communicate with a different their link conditions fall below a predetermined threshold.

20 Claims, 9 Drawing Sheets

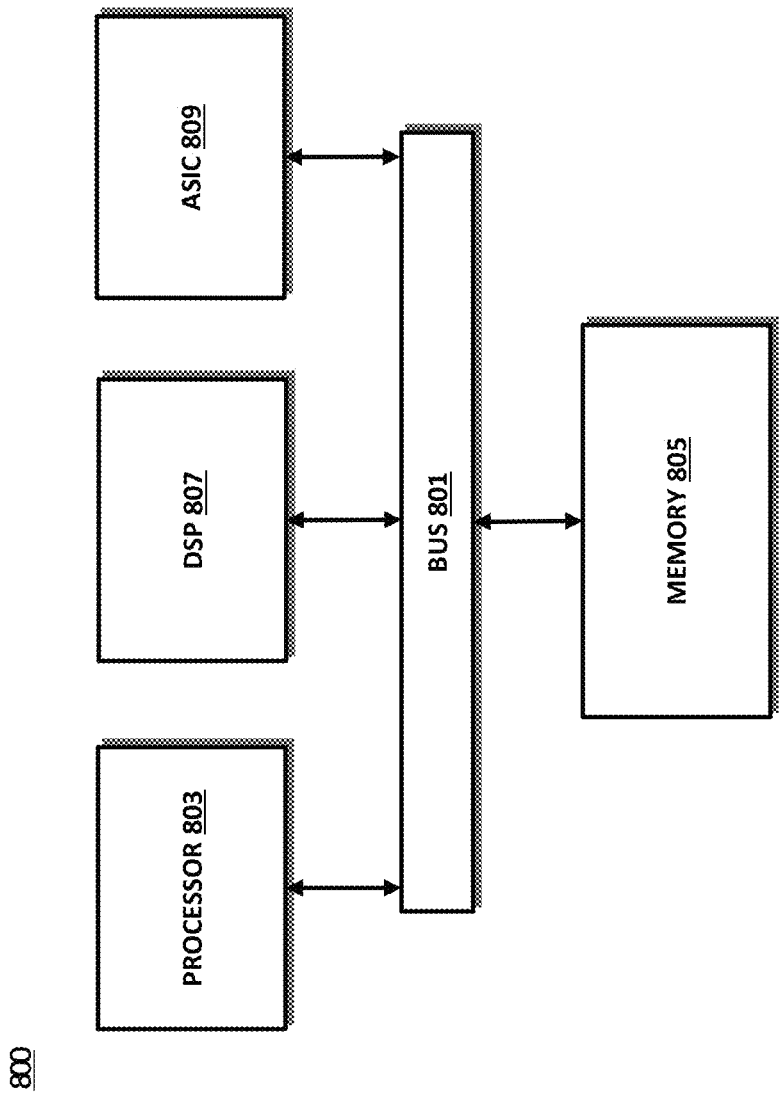

GATEWAY DIVERSITY OPERATION IN A SATELLITE NETWORK

BACKGROUND INFORMATION

Consumers utilize data networks for transmitting and receiving information using various platforms, or devices. Consumers are also capable of accessing data networks through various types of infrastructure (e.g., cable, DSL, fiber, etc.). Satellite networks have emerged as an option for consumers to access data, as well as voice, networks.

Satellite communication systems typically utilize a very small aperture terminal (VSAT) at the user location to establish communication over the satellite network. The VSAT allows a consumer to access, for example, data networks via multiple user devices. The VSAT is associated with a gateway which provides a point of connection to terrestrial data networks for the satellite network. During service initialization, a VSAT is linked to a particular gateway for all communications. This link is typically maintained until the VSAT is re-initialized, or re-ranged, by service personnel.

Gateways are typically configured to support links to many VSATS and other satellite communication devices. Since each VSAT (and satellite communication device) has a fixed link to a gateway, it can be difficult to manage and distribute load in a manner which maintains required quality of service (QoS) levels. Satellite communication systems are also susceptible to the effects environmental conditions such as rain, snow, etc., which can result in service interruptions. Depending on the current system loads, users may receive a lower quality of service. Since conventional VSATs are only capable of communicating with one gateway, consumers are forced to endure service interruptions and/or lower quality service during the aforementioned conditions. Based on the foregoing, there is a need for a satellite communication system that allows terminals to utilize a different gateway during service interruptions or reduced service quality.

BRIEF SUMMARY

A method and system are disclosed for selectively using different gateways with a diverse terminal. According to an embodiment, the method includes: assigning a diverse channel set to each of a plurality of diverse terminals, each diverse channel set including at least a forward channel from a primary gateway and a forward channel from a secondary gateway; designating the primary gateway and secondary gateway, respectively, as a home gateway and a foreign gateway for a first set of diverse terminals from the plurality of diverse terminals; designating the secondary gateway and primary gateway, respectively, as the home gateway and foreign gateway for a second set of diverse terminals from the plurality of diverse terminals; enabling communication between each diverse terminal and its home gateway along the forward channel assigned from the home gateway; monitoring link conditions between each diverse terminal and its home gateway or gateway with which it is currently enabled to communicate; and reconfiguring any diverse terminal for communication with the foreign gateway or a gateway with which it is not currently enabled to communicate, based at least in part, on its link conditions falling below a predetermined threshold.

According to another embodiment, the system includes a plurality of diverse terminals, a primary gateway, and a secondary gateway. The primary gateway is configured to route traffic between the plurality of diverse terminals and one or more networks, and comprises: a transceiver for transmitting/receiving data to/from the plurality of diverse terminals; one or more ports for transmitting/receiving data to/from the one or more networks, and establishing a distinct point of connection with the one or more networks; and at least one processor configured to: assign a first forward channel to each of a first set of the diverse terminals, assign a second forward channel to each of a second set of the diverse terminals, designate the primary gateway as a home gateway for the first set of diverse terminals, designate the primary gateway as a foreign gateway for the second set of diverse terminals, and enable communication with the first set of diverse terminals along the first forward channel. The secondary gateway is configured to route traffic between the plurality of diverse terminals and the one or more networks, and comprises: a transceiver for transmitting/receiving data to/from the plurality of diverse terminals; one or more ports for transmitting/receiving data to/from the one or more networks, and establishing a distinct point of connection with the one or more networks; and at least one processor configured to: assign a third forward channel to each of the first set of the diverse terminals, assign a fourth forward channel to each of the second set of the diverse terminals, designate the secondary gateway as a home gateway for the second set of diverse terminals, designate the secondary gateway as a foreign gateway for the first set of diverse terminals, and enable communication with the second set of diverse terminals along the third forward channel. The first forward channel and third forward channel define a diverse channel set for each of the first set of diverse terminals, and the second forward channel and fourth forward channel define a diverse channel set for each of the second set of diverse terminals, and each diverse terminal is configured to: monitor link conditions with its home gateway or a gateway with which it is currently enabled to communicate, and initiate communication with its foreign gateway or a gateway with which it is not currently enabled to communicate based, at least in part, on its link conditions falling below a predetermined threshold.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 8 is a diagram of a chip set that can be used to implement various exemplary embodiments.

DETAILED DESCRIPTION

A method and system for selectively using different gateways with a diverse terminal are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
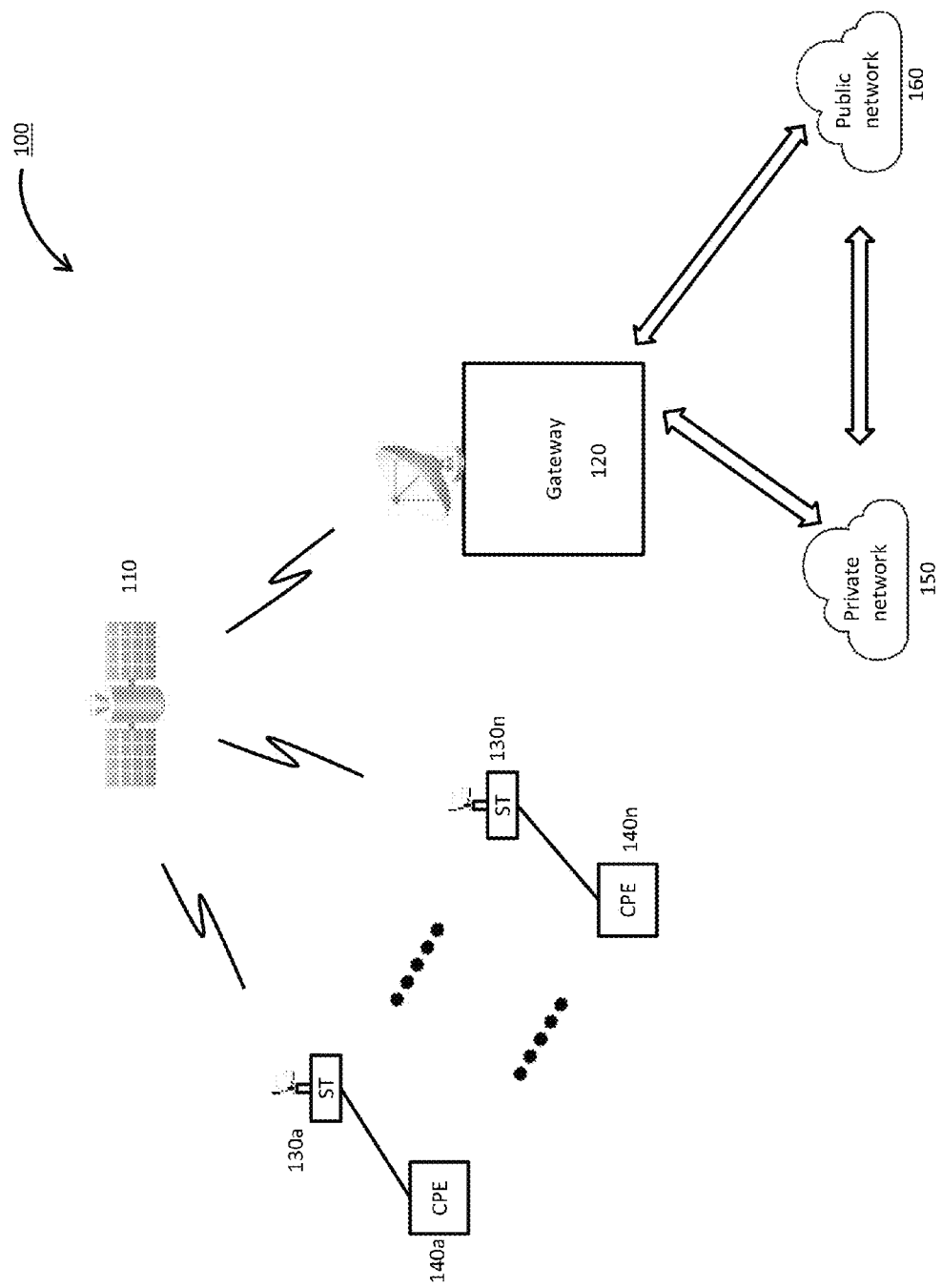
FIG. 1 is a diagram of a conventional satellite communication system capable of providing voice and data services.

FIG. 1 illustrates an exemplary satellite communication system 100 capable of providing voice and data services. The communication system 100 includes a satellite 110 that supports communications among a number of gateways 120 (only one shown) and multiple satellite terminals (STs) 130a-130n. Each satellite terminal (or terminal) 130 can be configured for relaying traffic between its customer premise equipment (CPEs) 140a-140n, a public network 150 such as the Internet, and/or from its private network 160. The gateway 120 can be configured to route this traffic across the public network 150 and private Internet 160 as appropriate. The gateway 120 can be further configured to route traffic from the public 150 Internet and private network 160 across the satellite link to the appropriate terminal 130. The terminal 130 then routes the traffic to the appropriate customer premise equipment (CPE) 140.

As illustrated in FIG. 1, the satellite communication system 100 facilitates communication between a satellite network, public communication networks 150, and private communication networks 160. Various embodiments, however, can also be configured for providing communication within only a terrestrial network (e.g., public communication networks 150 and private communication networks 160), or within only a satellite network. Thus, while components such as the terminals 130 and gateway 120, other network components such as, for example, a VPN router and a VPN gateway can be provided in place of, or in addition to, the illustrated terminal 130 and gateway 120. Furthermore, various embodiments can be incorporated within a router having QoS capabilities. Accordingly, the communication system 100 illustrated in FIG. 1 is only intended to be illustrative, and in no way restrictive.

Figure 2:
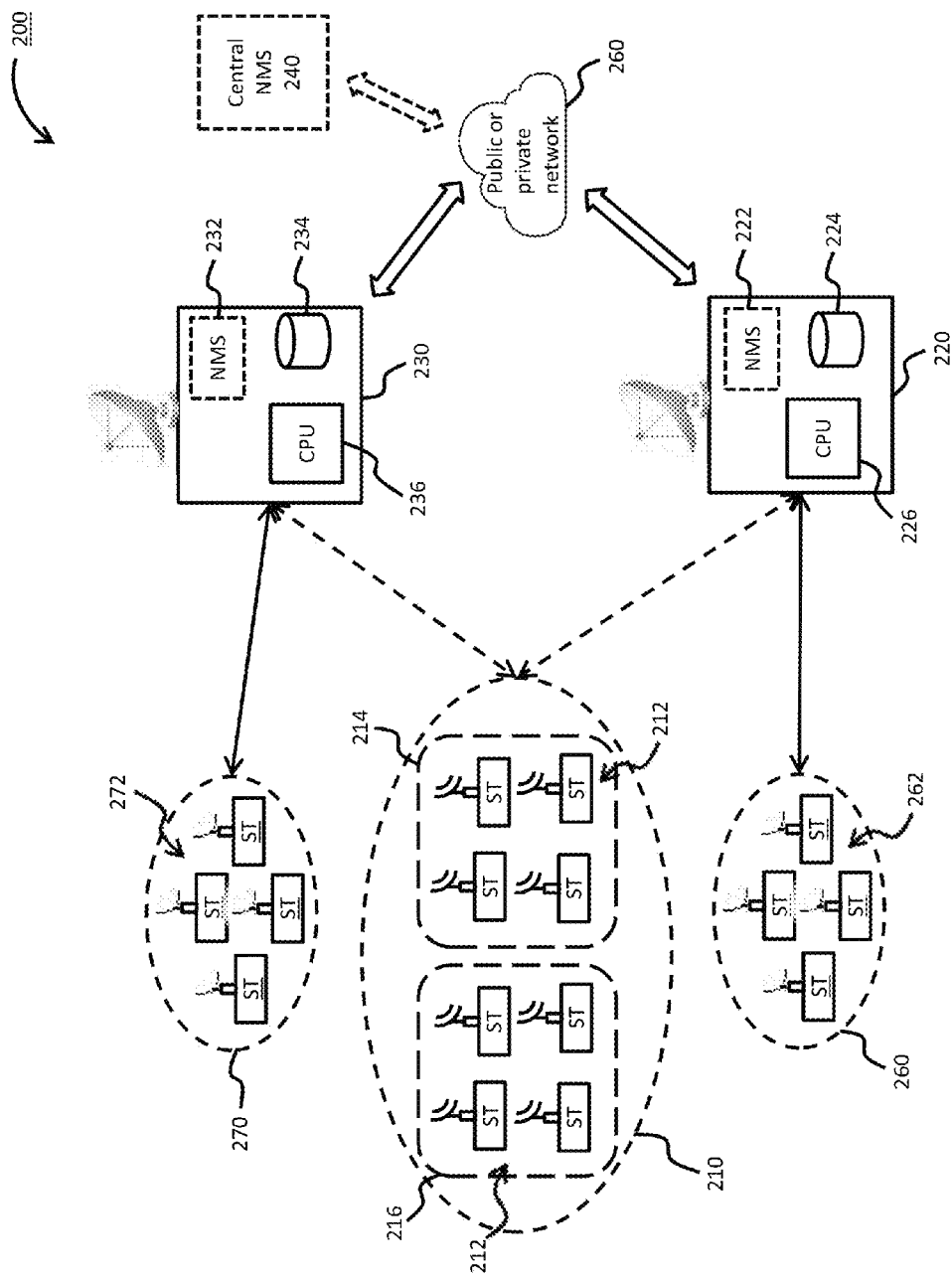
FIG. 2 is a diagram of a satellite communication system which incorporates diverse terminals, according to one embodiment.

FIG. 2 is a diagram of a satellite communication system 200 which incorporates diverse terminals, according to one embodiment. The satellite communication system 200 includes a plurality of diverse terminals identified by reference numeral 210, a primary gateway 220, and a secondary gateway 230. As will be discussed in greater detail below, each diverse terminal 212 can be configured to communicate with either the primary gateway 220 or the secondary gateway 230. According to the illustrated embodiment, the primary gateway 220 and secondary gateway 230 are also configured to communicate with external networks 260, such as a public network (e.g., the internet) and/or private network. Thus, the primary gateway 220 and the secondary gateway 230 are capable of relaying traffic between the plurality of diverse terminals 210 and the external networks 260.

As illustrated in FIG. 2, the primary gateway 220 includes, in part, a network management system (NMS) 222, a data storage unit 224, and a processing unit 226. The NMS 222 can be configured to manage and maintain the operational status of various components of the primary gateway 220 and its associated terminals. As such, the NMS 222 can access the data storage unit 224 to store and retrieve such information. Although FIG. 2 illustrates a single data storage unit 224, it should be appreciated that multiple storage units can be used based on specific implementation and requirements. Furthermore, multiple data storage units 224 can be maintained at different locations within the primary gateway 220 and linked internally for communication purposes. According to one or more embodiments, the processing unit 226 can be configured to manage all operational aspects of the primary gateway 220

The secondary gateway 230 also includes, in part, an NMS 232, a data storage unit 234, and a processing unit 236. The NMS 232 also functions to manage various aspects of the secondary gateway 230. According to the illustrated embodiment, the primary gateway 220 and the secondary gateway 230 each include an NMS that is physically located (or co-located) at the primary gateway 220 and the secondary gateway 222. According to various embodiments, the primary gateway's NMS 222 can exchange information with the secondary gateway's NMS 232 whenever necessary by using the external network 260. According to additional embodiments, a central NMS 240 can be located separately (e.g., at and off-site location) from the primary gateway 220 and the secondary gateway 230. Under such embodiments, NMS 222 and NMS 232 are not used. Rather, the central NMS 240 exchanges information with the primary gateway 220 and the secondary gateway 230 using the external network 260.

As illustrated in FIG. 2, the system 200 includes a number of diverse terminals 212. Each diverse terminal 212 is preconfigured such that it is capable of communicating with either the primary gateway 224 the secondary gateway 230, depending on the specific system requirements. Furthermore, such requirements can be monitored in real time, and dynamically adjusted. According to at least one embodiment, the diverse terminals 212 can be initially divided into a first set 214 and a second set 216. The first set 214 can be initially designated for communication with the primary gateway 220 as its home gateway, whereas the second set 216 can be initially designated for communication with the secondary gateway 230 as its home gateway.

In order to facilitate a configuration which allows the diverse terminals 212 to dynamically switch designation from the primary gateway 220 to the secondary gateway 230, each diverse terminal 212 is assigned a diverse channel set that includes a forward channel from the primary gateway 220 and a forward channel by the secondary gateway 230. For example, each diverse terminal 212 can have a different profile which corresponds to a particular gateway. A diverse terminal 212 can then independently select the appropriate profile (or reconfigure itself) for communicating with a different or particular gateway, once a particular criteria is met. As will be discussed in greater detail below, the criteria can be reached by the diverse terminal 212 based on current link conditions. The criteria can also be reached based on information received from the primary gateway 220 and/or secondary gateway 230 (e.g., for load balancing).

According to at least one embodiment, the primary gateway 220 can be designated as the home gateway for the first set 214 of diverse terminals 212. The primary gateway is also designated as a foreign gateway for the second set of diverse terminals 216. Thus, during initial operations, diverse terminals 212 from the first set are enabled for communication with the primary gateway 220 by default. Similarly, the secondary gateway 230 can be initially designated as the home gateway for the second set of diverse terminals 216, while also being designated as a foreign gateway for the first set of diverse terminals 214. Thus, diverse terminals 212 from the second set 216 are initially enabled for communication through the secondary gateway 230 by default. According to at least one embodiment, the gateways are assigned primary and secondary designations based, at least in part, on capacity (or bandwidth). Additionally, gateways can be designated as a home gateway based on the diverse terminal's quality of service requirements and/or subscription capacity. Thus, a diverse terminal 212 will typically receive better service when enabled for communication with its home gateway versus. its foreign gateway.

According to the illustrated embodiment, the system 200 can also include a first group of non-diverse terminals 262 (generally identified by reference numeral 260) that are configured for communication with the primary gateway 220. Contrary to the diverse terminals 212, the first group of non-diverse terminals 262 are permanently configured for communication with the primary gateway 220. More particularly, the first group of non-diverse terminals 262 are assigned a forward channel by the primary gateway 220. The forward channel is used for communication with only the primary gateway 220. The first group 260 of non-diverse terminals are incapable of reconfiguring themselves to communicate with the secondary gateway 230 in the event of failure or other incidents that can otherwise degrade the communication link.

The system 200 also includes a second group non-diverse terminals 272 that are configured for communication with the secondary gateway 230, and are assigned a forward channel by the secondary gateway 230. The second group of non-diverse terminals 272 is generally identified by reference numeral 270. The second group 270 of non-diverse terminals are incapable of reconfiguring themselves to communicate with the primary gateway 220. According to various embodiments, the primary gateway 220 can be designated the home gateway for the first group of non-diverse terminals 260, while the secondary gateway 230 can be considered the home gateway for the second group of non-diverse terminals 270. Since the neon-diverse terminals are only capable of communicating with their home gateway, they are not assigned to foreign gateways.

While FIG. 2 illustrates a hybrid system 200 that includes both diverse terminals 212 and non-diverse terminals 262, 272, it should be appreciated that the system 200 can be configured with only diverse terminals 212, thereby enabling communication using both the primary gateway 220 and the secondary gateway 230. According to at least one embodiment, the channels assigned to the diverse terminals 212 can be selected based on load metrics for channels that are available to either the primary gateway 220 or the secondary gateway 230. Each gateway subsequently assigns a forward channel for use by each diverse terminal 212 based on the load metrics. According to a specific implementation, the primary gateway 220 and the secondary gateway 230 provide service through their own satellite spectrums (i.e., exclusive satellite channels). Each gateway 220, 230 can be configured with one or multiple forward channels. A forward channel in the primary gateway 220, for example, has its diverse forward channel peer in the secondary gateway 230.

A diverse channel set, therefore, refers to tuple of two forward channels (one from each gateway) which allow a diverse terminal 212 to move between these two channels via corresponding gateways whenever such a need arises. According to various embodiments, each gateway can receive multiple exclusive channels, thereby allowing the use of, multiple diverse channel sets. Furthermore, each channel set would contain exclusive channels, meaning there is no intersection of channels between multiple diverse channel sets. Furthermore, a diverse terminal can only be assigned to one channel set at one time. As will be discussed in further detail below, however, various embodiments can allow for more than two gateways.

According to an embodiment, each gateway selects one of the diverse channel sets to a diverse terminal 21 with an objective of keeping multiple diverse channel sets balanced in regards to load on those channels. For example, if the primary gateway 220 is provided with two forward channels Pf1, Pf2 and the secondary gateway 230 is also provided with two forward channels Sf1 and Sf2, the following two diverse channel sets would exist:

$$\text{diverse channel set } A = \{Pf1, Sf1\}$$

$$\text{diverse channel set } B = \{Pf2, Sf2\}.$$

The gateways 220, 230 evaluate the metric of each individual channel in each diverse channel set and selects an optimal diverse channel set for the diverse terminal 212. Each forward channel in a diverse channel set is assigned two weights, one for diverse terminals whose home gateway implements the channel and another for diverse terminals whose foreign gateway hosts the channel.

Consider the case where $D_i$ is the diverse channel set in the network, where i=1, ... N, and N is the number of diverse sets. Each diverse set is represented by two channels, one from each gateway. Let $P_i$ and $S_i$ be the two channels in a diverse set i, where i=1, ... N. The channel $P_i$ is from the primary gateway and $S_i$ is from the secondary gateway. For one set of diverse terminals $P_i$ is the home channel and $S_i$ is the foreign channel, whereas for other set of diverse terminals $P_i$ is the foreign channel and $S_i$ is the home channel. As previously discussed, each channel in a diverse channel set is configured with two weights, one for terminals with this channel as its home channel and another for terminals with this channel as its foreign channel. Let $W_{ph,i}$ and $W_{pf,i}$ be the two weights of the channel $P_i$ of a diverse channel set i for terminals with this channel as their home channel and foreign channel, respectively. Let $W_{sh,i}$ and $W_{sf,i}$ be the two weights of the channel $P_1$ of a diverse channel set i for terminals with this channel as their home channel and foreign channel, respectively. Therefore, $W_{ph,i}+W_{sf,i}=1$ applies for the first set of terminals whose home gateway is the primary gateway and $W_{pf,i}+W_{sh,i}=1$ applies for the second set of terminals whose home is the secondary gateway.

As previously discussed, a diverse terminal 212 typically gets better QoS from its home gateway than from its foreign gateway. Thus, while assigning a diverse channel set, preference is given to those where the home gateway has more availability with respect to a particular diverse terminal 212. For example, if $W_{ph,i}=1$ and $W_{sf,i}=0$ for one set of terminals whose home is the primary gateway 220, diverse channel set will be selected by comparing load metrics of only the home channels of the diverse terminals 212 from each diverse set. The load of the other channel (i.e., foreign channel with respect to this terminal) will not matter. For the other set of diverse terminals, $W_{pf,i}=0$ and $W_{sh,i}=1$ indicates that the load comparison will occur by only using the home channels for the diverse terminals among N diverse sets. Again the load on the foreign channels would not matter. Acceding to at least one embodiment, the weights can be configured by the co-located NMS 222, 232 or the central NMS 240. The following inequalities can be used as constraints:

$$W_{ph,i} \geq W_{sf,i}$$

$$W_{pf,i} \leq W_{sh,i}$$

The effective load metric of a diverse channel set, based on whether or not the primary gateway is the home gateway or foreign gateway for a diverse terminal, can be determined as:

$$M_{d,n}=W_{ph,i}*M_{p,i}W_{sf,i}*M_{s,i}$$

$$M_{d,n}=W_{pf,i}*M_{p,i}W_{sh,i}*M_{s,i}$$

where $M_{p,i}$ is the load metric for the primary gateway channels and $M_{s,i}$ is the load metric for the secondary gateway channels. Based on the results, higher load metrics represent a higher channel load. The gateway would select the diverse channel set for which the above equation results in the lowest value. If two or more diverse sets have the same lowest value, the diverse set is selected which has the lowest home channel metric with respect to a terminal. An example will make it clear.

Consider the following three diverse channel sets: {P1, S1}, {P2, S2}, and {P3, S3} where P1, P2 and P3 channels are from the primary gateway 220, and S1, S2, S3 are from the secondary gateway 230. Load metrics for three channels P1, P2, and P3 of the primary gateway 220 are: $M_{p,1}=80$, $M_{p,2}=50$, $M_{p,3}=40$ respectively. Load metrics for three channels S1, S2, and S3 of the secondary gateway are $M_{s,1}=50$, $M_{s,2}=10$, $M_{s,3}=90$ respectively.

For a diverse terminal whose home gateway is the primary gateway 220 and weights between home and foreign $W_{ph,i}=0.8$, and $W_{ph,i}=0.2$:

$$M_{d,1}=W_{ph,i}*M_{p,1}W_{sf,i}*M_{s,2}=64+2=66$$

$$M_{d,2}=W_{ph,i}*M_{p,2}W_{sf,i}*M_{s,1}=40+10=50$$

$$M_{d,3}=W_{ph,i}*M_{p,3}W_{sf,i}*M_{s,3}=32+18=50$$

The diverse set $M_{d,2}$ and $M_{d,3}$ are the candidates as they have the lowest combined metric 50. Since the primary gateway 220 is the home gateway for this diverse terminal, $M_{d,3}$ is selected because the channel P3 has a lower metric of 32 than channel P2 which has a metric of 40. After assigning a diverse channel set to a diverse terminal 212, the load metric of two individual channels of that diverse channel set (one from each gateway) are updated.

According to at least one embodiment, reconfiguration of diverse terminals 212 for communication with another gateway can be initiated by the diverse terminal itself. For example, a diverse terminal 212 can continually monitor the link conditions of its communication channel during normal operations. If the diverse terminal 212 has not been reconfigured, then the link conditions would be based on the 4 channel assigned by its home gateway. For example, the first set of diverse terminals 214 can monitor link conditions of respective forward channels assigned by their home gateway (e.g., the primary gateway 220). The second set of diverse terminals 216 would monitor link conditions associated with the forward channels assigned by their home gateway (the secondary gateway 230).

If a diverse terminal 212 loses lock on its current forward channel, it waits for a preset time interval to determine if the signal has really been lost. Depending on whether the diverse terminal 212 has previously been reconfigured or not, the current forward channel can correspond to that assigned for either the home channel or the foreign channel. If the time interval has elapsed and the signal still has not been re-acquired, the diverse terminal 212 reconfigures itself to try the forward channel from the other gateway. As previously discussed, the diverse terminal 212 can have multiple profiles (or configurations) corresponding to multiple gateways. Thus, if the diverse terminal 212 is currently using a first profile to communicate with its home gateway, it would select the second profile in order to initiate communication with its foreign gateway along the appropriate forward channel. The diverse terminal 212 can be configured to wait a predetermined amount of time to assess whether a stable signal can be maintained on the forward channel of the other gateway. The diverse terminal 212 then stays on the new forward channel until it loses lock again. According to at least one embodiment, when a diverse terminal 212 is reset, it always tries to lock on its home gateway regardless of which gateway was in use at the time of reset.

As can be appreciated, the signal quality on the forward channel can degrade due to atmospheric conditions such as precipitation. Such conditions will often result in reduced data transmission rates and/or voice quality. Rather than subject users to the lower quality of service, the diverse terminal 212 can advantageously initiate reconfiguration to discontinue communication with its home gateway, or active gateway, (depending on the number of previous reconfigurations), and initiate communication with its foreign gateway (or a new gateway). According to at least one embodiment, the diverse terminal 212 can monitor the link conditions to determine whether or not they fall below a predetermined threshold. Once the link conditions fall below the threshold, the diverse terminal 212 can initiate reconfiguration (e.g., selects a different configuration/profile) to communicate with the foreign gateway. Additionally, the diverse terminals can detect link failures that are indicative of a partial or complete service disruption, for example, from the primary gateway 220. Under such conditions, all the diverse terminals from the first set 214 can be reconfigured to communicate with the secondary gateway 230. As previously discussed, the first group of non-diverse terminals 260 are permanently configured to communicate with the primary gateway 220. In contrast with the first set of diverse terminals 214, the first group of non-diverse terminals 260 would be subject to a service interruption until the primary gateway 220 becomes active once again.

When a diverse terminal 212 is reconfigured (or selects a different configuration/profile) for communication with a new gateway, the switch is executed as seamlessly as possible in order to avoid or minimize service disruptions. According to at least one embodiment, the home gateway transfers all network session information associated with the diverse terminal 212 to the foreign gateway (or new gateway). The network session information can include various items associated with the diverse terminal's previous session with its home gateway, including at least a root session key, a unicast key version number, and a volume usage that access policy, etc.

According to an embodiment, there is no need for diverse terminals to re-range after a gateway switch. The primary gateway 220 and secondary gateway 230 can be configured to share the same root key used to derive individual diverse terminal keys. The key management system (KMS) of the primary gateway's NMS 232 sends the same root session key as well as unicast, multicast session key version numbers to the relevant gateway components of both gateways. Therefore the diverse terminal continues to use the same keys across gateways switch. Volume usage Fair Access Policy (FAP) state of a diverse terminal 212 is also maintained across the gateway switch over. This can be achieved, for example, by conveying the last FAP information from the diverse terminal 212 to the associated Internet Protocol gateway (IPGW) of the gateway after the switch over. While the diverse terminal 212 is operational on a particular gateway, it receives the FAP state from the IPGW periodically through keep-alive messages. The keep-alive messages allow the connectivity between the diverse terminal 212 and gateway to remain active even when no user data is flowing through the diverse terminal.

The diverse terminals 212 continue to receive user multicast sessions upon gateway switch. The multicast transmission and infrastructure are such that the sessions are sent through the external networks 260 to both gateways simultaneously. However, the gateways selectively send the multicast sessions to the VSAT population on appropriate forward channels. If all diverse terminals 212 on a particular gateway do not have an interest in receiving a particular multicast session, the gateway does not send the session over the air to avoid unnecessary waste of satellite bandwidth.

According to at least one embodiment, the system can address link performance difference from one gateway to another by configuring and downloading different trajectory tables for each gateway for the usage by diverse terminals for their link adaptation. A trajectory table for the forward link can be configured as an ordered list of tuples, modulation and coding rates, along with the target link quality or Es/No that the diverse terminal should follow to select the optimum channel in the event of link fluctuation. A trajectory table for the return link can also be configured as an ordered list of tuples, symbol, modulation and coding rates along with the target link quality or Es/No that the diverse terminal should follow to select the optimum channel in the event of link fluctuation. Such a mechanism allows a diverse terminal to use different powers to transmit on the same rates when switching between the two different gateways and thus handles link performance differences from two gateways.

As previously discussed, each gateway is configured to connect with the external networks at distinct points of connection. Accordingly, the Internet Protocol (IP) addresses associated with the primary gateway 220 will differ from those associated with the secondary gateway 230. Such changes can often time result in adverse performance for the reconfigured diverse terminal. According to one or more embodiments, the system allows diverse terminals 212 to preserve the same public static IP address across gateway switch through BGP (Border Gateway Protocol) based dynamic routing support. The routes of user devices behind the terminals are propagated via BGP to the new gateway after the switch. The new gateway, in turn, advertises these routes towards the external networks 250. A new cost that is lower than that of the routes advertised from the switched previous gateway is used in order to achieve faster BGP routing convergence. When a diverse terminal 212 is given a Static IPv4 or IPv6 plan, the IPv4 subnet or IPv6 prefix is preserved between a gateway switch. Since a diverse terminal 212 can switch between its home gateway and its foreign gateway, the IPGW at each gateway indicates the true status of reachability to the terminal at any given point of time. The dynamic routing feature (uses BGP) at the IPGW (in both gateways) and on the diverse terminals ensure true reachability at any time of operation.

When a diverse terminal 212 switches over from its home gateway to its foreign gateway (or vice-versa), the current network traffic needs to be diverted to the new gateway. Although the traffic will switchover automatically when the BGP times out, it would be more efficient to divert the traffic as soon as the switchover occurs. According to an embodiment, this can be achieved by making the new gateway announce a more attractive route to the terminal to the external network in its BGP messages. In order to make the new gateway announce a more attractive route, the diverse terminal 212 decrements the cost for its local routes by a configurable value (e.g., gateway switchover metric) for a configurable duration (gateway switchover duration) in its BGP messages to the new gateway upon a switchover. Once the duration expires, the diverse terminal 212 restores the costs to their previous values. The diverse terminal actually advertises a cost of 1+gateway switchover metric for the local subnet by default, and decrements the cost by gateway switchover metric i.e., cost is 1 upon a gateway switchover. The original cost can be restored once a specified timer expires.

According to various embodiments, reconfiguration of diverse terminals can be initiated by the gateways. For example, both gateways can exchange information to determine whether an imbalance exists between the current load on one gateway relative to the load on the other gateway. Thus, the primary gateway 220 can determine if an imbalance exists between its current load and the load on the secondary gateway 230. The primary gateway 220 can then select (or identify) one or more diverse terminals 212 to be moved to (i.e., reconfigured to communicate with) the secondary gateway 230. The selected diverse terminals 212 would then use the appropriate configuration or profile for communicating with the secondary gateway 230. According to at least one embodiment, gateway imbalance can be determined by monitoring an oversubscription ratio of diverse terminals in the primary gateway 220 and the secondary gateway 220 against the configured QoS and service plan. When the load gets imbalanced, the gateway evaluates which diverse terminals 212 should be moved from which gateway to the other. Once the terminals are identified, the gateway sends the switch command to individual terminals.

The oversubscription ratio can be calculated at both gateways for diverse terminals, according to an embodiment. The estimated capacity of pairs of channels of each diverse channel set can be periodically calculated or calculated in real time. The calculation can take into consideration of recent usage history of modulation and coding (MODCOD) on those channels. Let $C_{i,p}$ be the capacity of the channel in the primary gateway 220 of the diverse set i, and $C_{i,s}$ be the capacity of the channel in the secondary gateway 230 of the diverse set i. The oversubscription ratio is given by the following equation at two gateways for the diverse set i:

primary gateway, $$O_{i,p} = \frac{\sum_{j=0}^{N} SP_j}{C_{i,p}}$$

where N is the current number of terminals on the gateway and $SP_j$ is the configured service plan value of terminal j.

secondary gateway, $$O_{i,s} = \frac{\sum_{j=0}^{M} SP_j}{C_{i,s}}$$

M is the current number of terminals on the gateway and $SP_j$ is the configured service plan value of terminal j. If the channel is not fully loaded, then oversubscription ratio is simply given by the ratio of current load divided by the capacity.

As the number of active terminals vary over time, an exponential moving average of the oversubscription ratio can be calculated over a time duration before the ratio is used for comparison purposes to determine a potential imbalance issue. According to an embodiment, $O_{i,p}$ is compared to $O_{i,s}$, and the diverse set i is deemed to be balanced if the difference is within a configured delta value. Otherwise, the gateway considers that this diverse set became embanked and tries to balance the load. The gateway selects diverse terminals to be moved based on the QoS configuration from the more oversubscribed gateway as potential movers to the undersubscribed gateway. Updated oversubscription ratios are calculated as if the selected diverse terminals were actually moved to the other gateway. When the difference between $O_{i,p}$ and to $O_{i,s}$ is not within the configured delta, the actual move is initiated. For example a control command can be sent to the terminal via SNMP. Batch commands can also be used so that only one message can be sent to target multiple terminals.

According to various embodiments, a virtual network operator (VNO) can be used to provide service from the primary gateway 220 and/or the secondary gateway 230 in a diversity configuration. For example, the VNO can either subscribe bandwidth from one gateway or both gateways. The VNOs can also be present on both gateways with the same VNO identifier. Different subscription values and different priority weights can be assigned to a VNO on different gateways.

Figure 3:
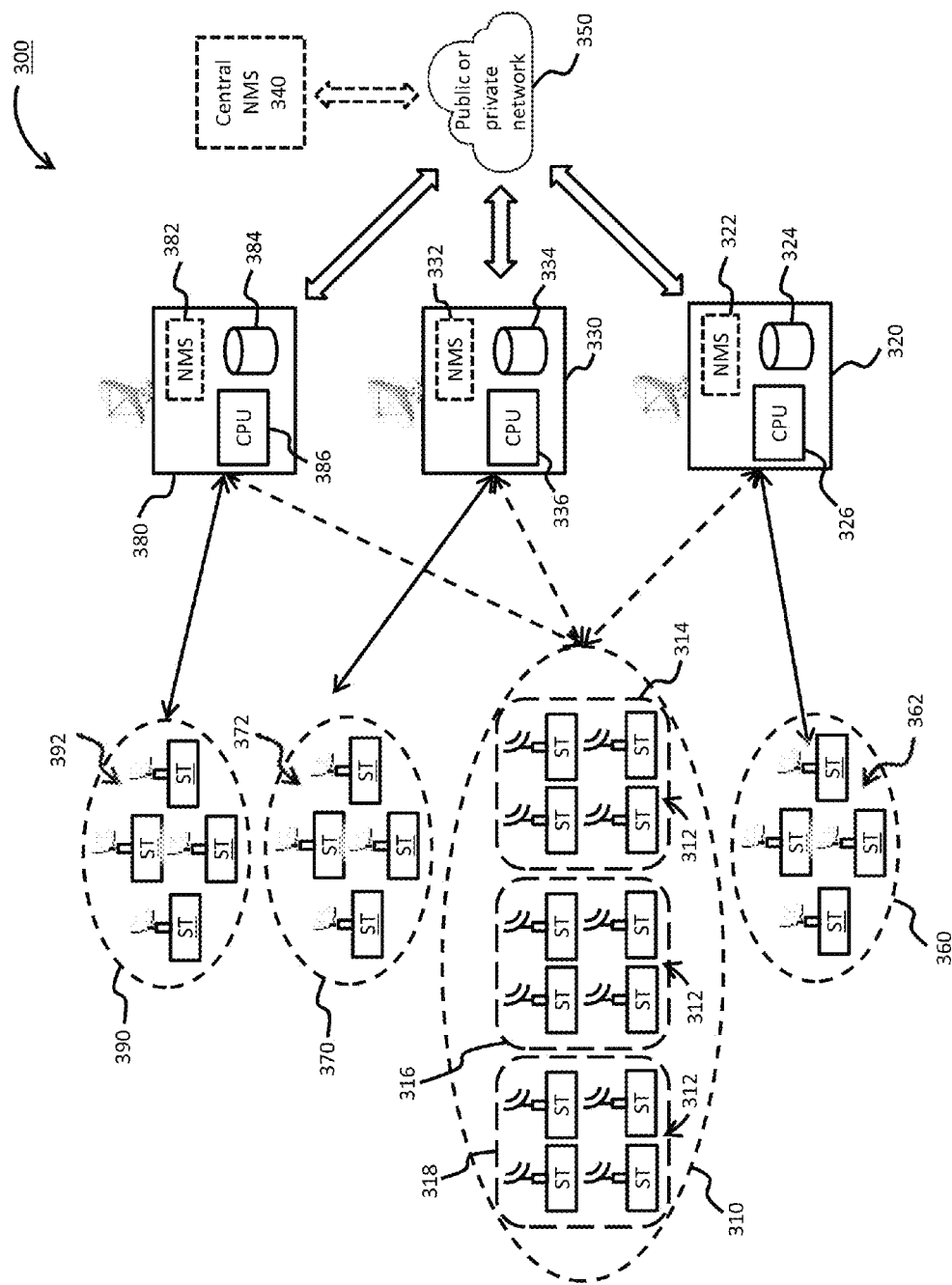
FIG. 3 is a diagram of a satellite communication system which incorporates diverse terminals and multiple gateways, according to one embodiment.

FIG. 3 is a diagram of a satellite communication system which incorporates diverse terminals and multiple gateways, according to one embodiment. The system 300 includes various features that are similar to those shown in the system of FIG. 2. For example, the system 300 includes a primary gateway 320 and a secondary gateway 330. The primary gateway 320 includes a local NMS 322, a storage unit 324, and a processing unit 326. Similarly, the secondary gateway 330 includes a local NMS 332, a storage unit 334, and a processing unit 336. According to other embodiments, a central NMS 340 can be provided at an external location, instead of the local NMS (322, 332, 382). The primary gateway 320, secondary gateway 330, and central NMS 340 are capable of communicating and exchanging information over one or more external networks 350.

The system 300 also includes a plurality of diverse terminals 312 (generally identified as a group by reference number 310) that are capable of communicating with the primary gateway 320 or secondary gateway 330. More particularly, a first group of diverse terminals 314 can have the primary gateway 320 designated as their home gateway. The secondary gateway 330 can further be designated as the home gateway for a second set of diverse terminals 360. The primary gateway 320 can optionally support a first group of non-diverse terminals 362 (generally represented by reference numeral 360) that operate in the same manner as conventional terminals. Similarly, the secondary gateway 330 can be configured to optionally support a second group of non-diverse terminals 372 (generally represented by reference numeral 370).

According to the illustrated embodiment, the system 300 further includes an additional gateway 380. The additional gateway 380 also includes a local NMS 382 and storage unit 384 having features that are consistent with those previously described with respect to the gateways illustrated in FIG. 2. According to the illustrated embodiment, however, the additional gateway 380 is configured as a home gateway for a third set of diverse terminals 318. Accordingly, the additional gateway 380 assigns a forward channel to each of the diverse terminals 312. The diverse channel set assigned to each diverse terminal 312 thus includes three forward channels, namely one forward channel from the primary gateway 320, one forward channel from the secondary gateway 330, and one forward channel from the additional gateway 380. Additionally, the primary gateway 320 and secondary gateway 330 are designated as foreign gateways for the third set of diverse terminals 318. The additional gateway 380 is also designated as a foreign gateway for the first set of diverse terminals 314 and the second set of diverse terminals 316. The additional gateway can further be configured to optionally support a third group of non-diverse terminals 392 (generally represented by reference numeral 390).

According to the embodiment illustrated in FIG. 3, diverse terminals 312 can reconfigure themselves to communicate with either the primary gateway 320, the secondary gateway 330, or the additional gateway 380 in order to optimize load balance and service quality. While FIG. 3 illustrates one additional gateway 380, it should be appreciated that various embodiments can support additional gateways depending on system constraints and configurations. For example, satellite coverage beams and gateway location can determine whether or not a system can be configured to incorporate, for example, 4, 5, etc. gateways. Thus, the features described with respect to FIG. 3 should not be construed as limiting in any way.

Figure 4:
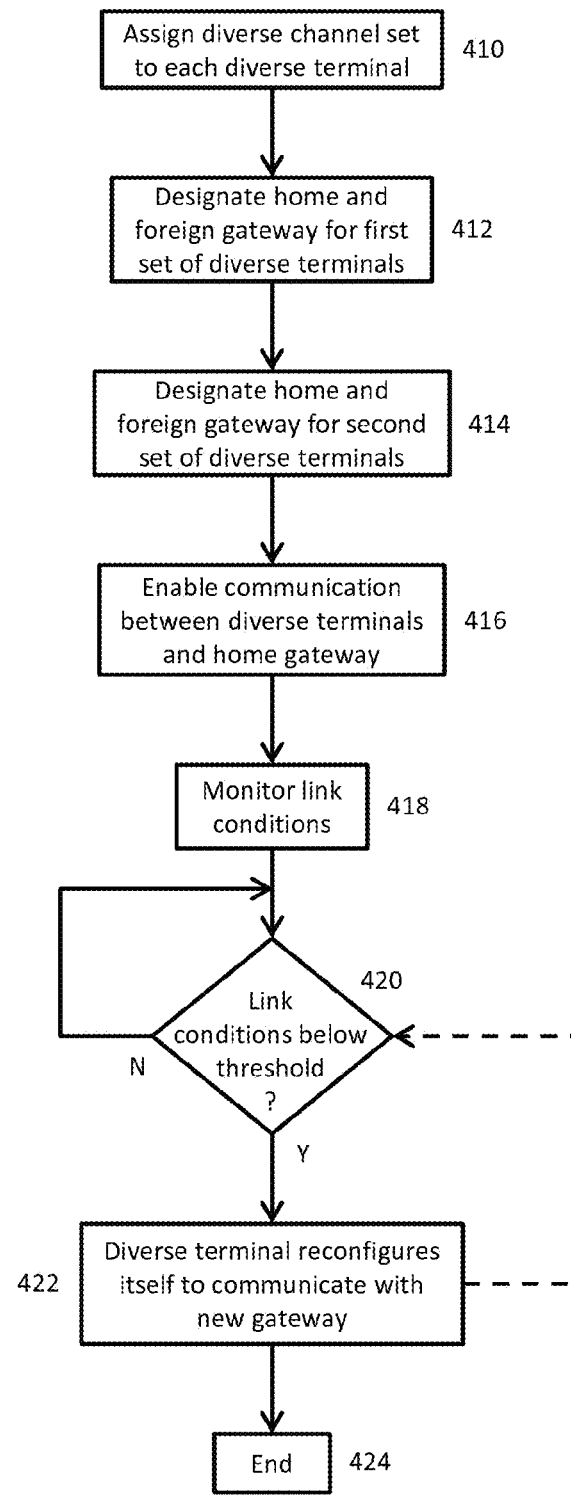
FIG. 4 is a flowchart of a process managing diverse terminals, according to at least one embodiment.

FIG. 4 is a flowchart of a process managing diverse terminals, according to at least one embodiment. At 410, a diverse channel set is assigned to each diverse terminal. As previously discussed, each gateway can examine various metrics associated with its channel loads in order to determine which specific channels should be assigned to each diverse terminal. The diverse channel set can subsequently include a forward channel from each gateway within the system. At 412, home and foreign gateways are designated for a first set of diverse terminals. As previously discussed, the home gateway will typically provide a higher quality of service to the diverse terminal in comparison to the foreign gateway. At 414, home and foreign gateways are designated for a second set of diverse terminals. At 416, communication is enabled between each diverse terminal and its home gateway.

At 418, each diverse terminal monitors its link conditions with the home gateway (or current gateway). At 420, the diverse terminal determines if its link conditions have fallen below a predetermined threshold. If the link conditions have not fallen, or degraded, below the threshold, then control returns to 420 where the diverse terminal continues to check if its link conditions have fallen below the threshold level. If it is determined that the link conditions have degraded below the threshold level, then the diverse terminal reconfigures itself for communication with a new gateway at 422. For example, if the diverse terminal was enabled for communication with its home gateway prior to degradation of the link conditions, it would reconfigure itself for communication with the foreign gateway. Similarly, if the diverse terminal was enabled for communication with the foreign gateway prior to degradation of link conditions, it would reconfigure itself for communication with its home gateway. The process subsequently ends at 424.

Figure 5A:
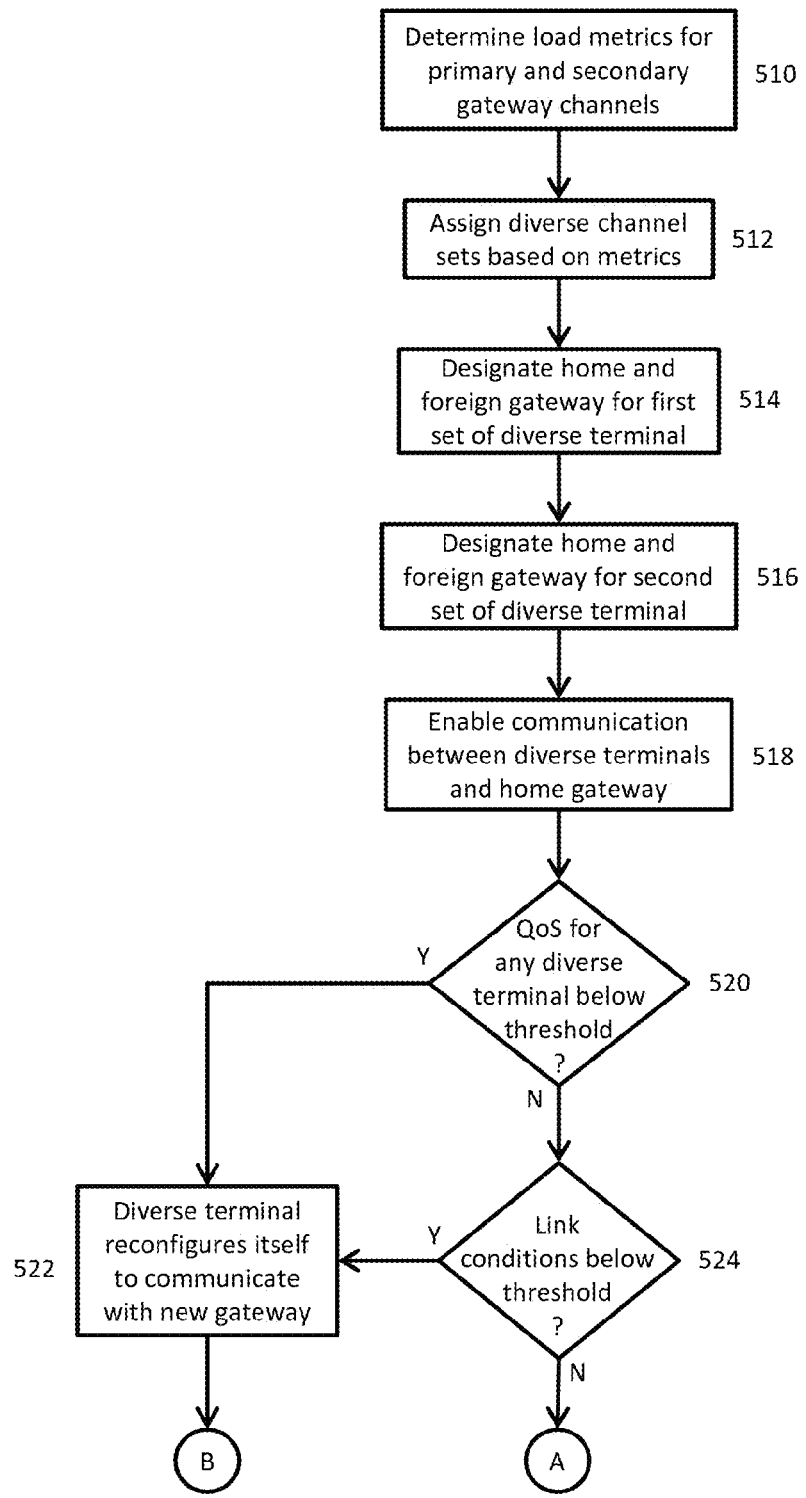
FIGS. 5A and 5B are a flowchart of a process for managing diverse terminals, according to one or more embodiments.
Figure 5B:
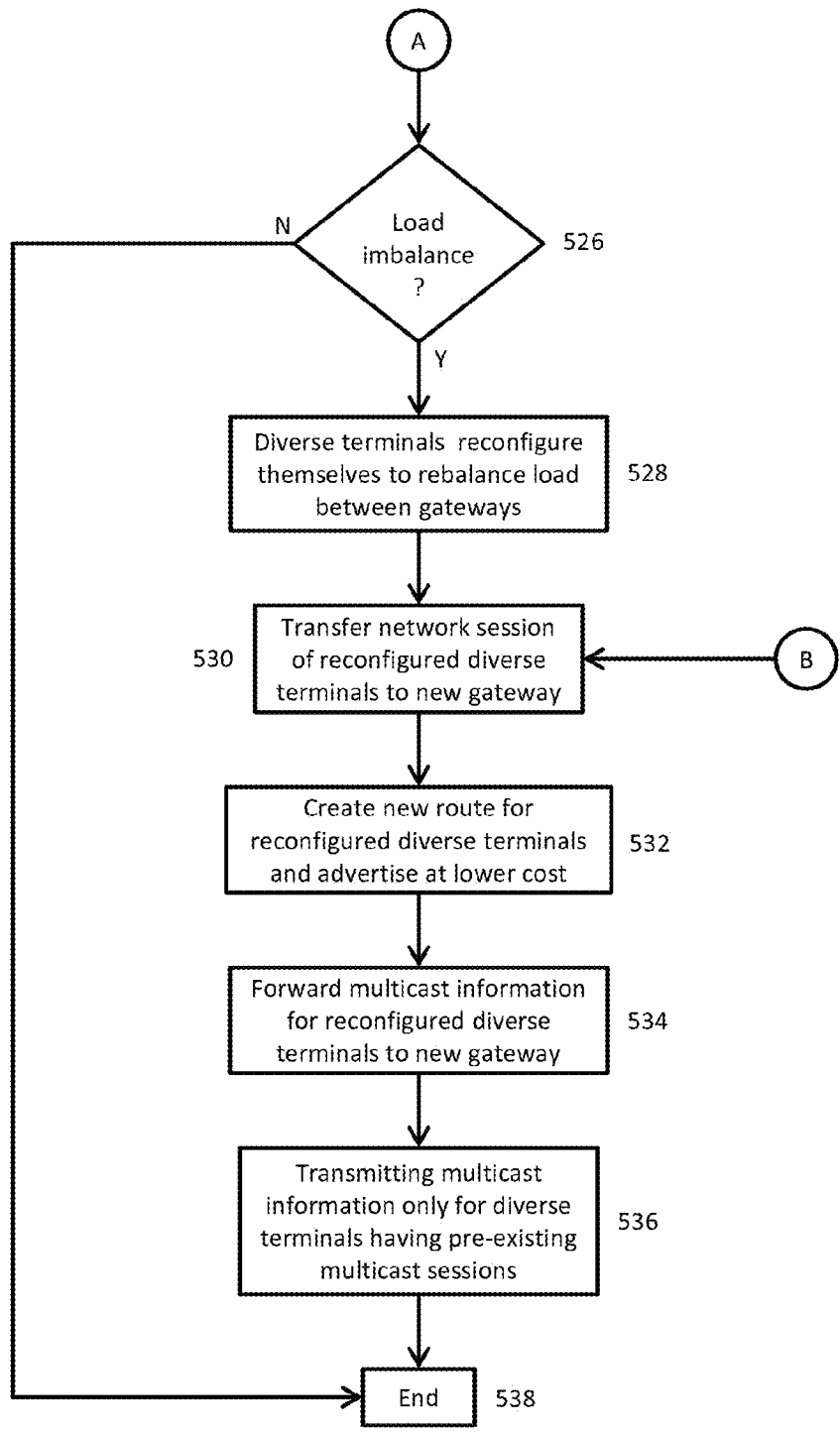

FIGS. 5A and 5B are a flowchart of a process for managing diverse terminals, according to one or more embodiments. At 510, load metrics are determined for channels of the primary and secondary gateways. At 512, diverse channel sets are assigned to each diverse terminal based on the load metrics. At 514, home and foreign gateways are designated for a first set of diverse terminals. At 516, home and foreign gateways are designated for the second set of diverse terminals. For example, the primary gateway can be designated as the home gateway for the first set of diverse terminals and the secondary gateway can be designated as the foreign gateway for the first set of diverse terminals. Similarly, the secondary gateway can be designated as the home gateway for the second set of diverse terminals, while the primary gateway is designated as the foreign gateway for the second set of diverse terminals. At 518, communication is enabled between each diverse terminal and its home gateway.

At 520 a test is performed to determine if the quality of service for any diverse terminal has fallen below a predetermined threshold. According to at least one embodiment, each diverse terminal can be configured to monitor its quality of service relative to subscribed services from its home gateway. If the quality of service as degraded below the threshold level, then the diverse terminal would reconfigure itself for communication with a new gateway. According to the embodiment illustrated in FIG. 2, for example, a diverse terminal that is currently enabled for communication with the primary gateway as its home gateway would reconfigure itself for communication with the secondary gateway (or its foreign gateway). According to the embodiment illustrated in FIG. 3, however, a diverse terminal currently enabled for communication with the primary gateway as its home gateway would have an option of reconfiguring itself for communication with either the secondary gateway or the additional gateway, both of which are designated as its foreign gateways. The diverse terminal would have an option of selecting the foreign gateway capable of providing the higher level of service quality.

If it is determined that the quality of service for the diverse terminal is above the minimum threshold, then control passes to 524. A test is performed to determine whether link conditions have degraded below a preset threshold level. If the link conditions have degraded below the threshold level, then control passes to 522, where the diverse terminal reconfigures itself for communication with a new gateway. Alternatively, if the link conditions have not degraded below the threshold level then control passes to 526. At 526, the load on each gateway is examined in order to determine whether and imbalance has occurred. If a load imbalance has not occurred, then the process ends. As can be appreciated, however, the system load changes dynamically and the gateways continually monitor loads in real time. Thus, load imbalance can optionally be checked on a continuous basis during continued operations. Similarly, each diverse terminal would continually examine its link conditions and quality of service in order to determine whether any reconfigurations should be made.

If a load imbalance is detected, then at 528, one or more diverse terminals can reconfigure themselves in order to rebalance the load between the gateways. For example, according to the embodiment illustrated in FIG. 2, diverse terminals would be reconfigured to communicate with either the primary gateway or the secondary gateway. According to the embodiment illustrated in FIG. 3, diverse terminals could be reconfigured to communicate with either the primary gateway, the secondary gateway, or any additional gateways. According to still further embodiments, diverse terminals can reconfigure themselves such that they are redistributed partially or completely in order to optimize the load balancing process. At 530, the network session of any reconfigured diverse terminals are transferred to the new gateway. As previously discussed, the network sessions can include various information necessary to seamlessly continue the diverse terminals session after being reconfigured for communication with the new gateway.

At 532, a new route is created for any reconfigured diverse terminals and advertised at a lower cost. For example, the new gateway would create the route in order to maintain traffic flow to the new terminal without any disruption in service. At 534, multicast information for the reconfigured diverse terminals are forwarded to the new gateway. At 536, the new gateway transmits the multicast information only for diverse terminals which had pre-existing multicast sessions prior to being reconfigured. The process ends at 538.

Figure 6:
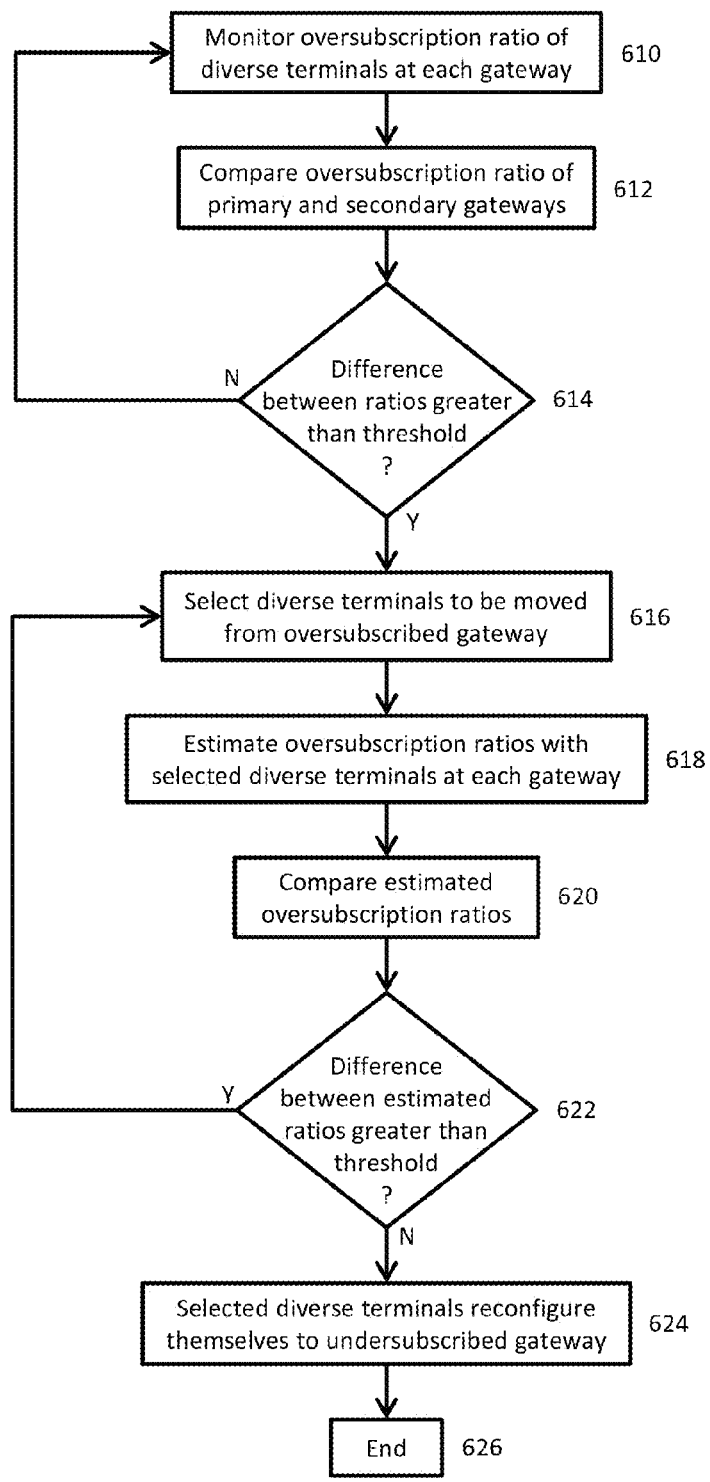
FIG. 6 is a flowchart of a process for balancing diverse terminals between multiple gateways, according to one embodiment.

FIG. 6 is a flowchart of a process for balancing diverse terminals between multiple gateways, according to one embodiment. At 610, the oversubscription ratio of diverse terminals at each gateway is monitored. According to at least one embodiment this can be performed in real-time by each gateway. At 612, the oversubscription ratio of the primary and secondary gateways are compared to each other. At 614, a test is performed to determine whether the difference between the oversubscription ratios is greater than a predetermined threshold. If the difference does not exceed the threshold, then no imbalance is present. Control then returns to 610. If the difference between the oversubscription ratios is greater than the threshold, however, control passes to 616 where one or more diverse terminals are selected to be moved from the oversubscribed gateway. For example, if the primary gateway of the embodiment illustrated in FIG. 2 is determined to be oversubscribed, then one or more diverse terminals from the first set would be selected to be moved.

At 618, the oversubscription ratios are estimated with the selected diverse terminals at each gateway. More particularly, the oversubscription ratios are determined (or estimated) as if the selected diverse terminals had been moved to the new gateways. At this point, however, no diverse terminals have actually been reconfigured (or moved). At 620, the estimated oversubscription ratios are compared. At 622, a test is performed to determine whether the difference between the estimated oversubscription ratios is greater than the threshold.

According to at least one embodiment, the threshold used for the estimated oversubscription ratios can be the same used for the actual oversubscription ratios at 614. If the difference between the estimated oversubscription ratios is greater than the threshold, then control returns to 616 where additional diverse terminals are selected to be moved from the oversubscribed gateway. If the difference between the estimated oversubscription ratios does not exceed the threshold, however, control passes to 624. The selected diverse terminals are then moved to the undersubscribed gateway. According to at least one embodiment, the oversubscribed gateway can issue a single command which causes all of the selected diverse terminals to reconfigure themselves for communication with (or be moved to) the undersubscribed gateway. According to further embodiments, diverse terminals can be moved from both gateways in order to further improve load balancing and/or reach the desired thresholds. The process then ends at 626.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
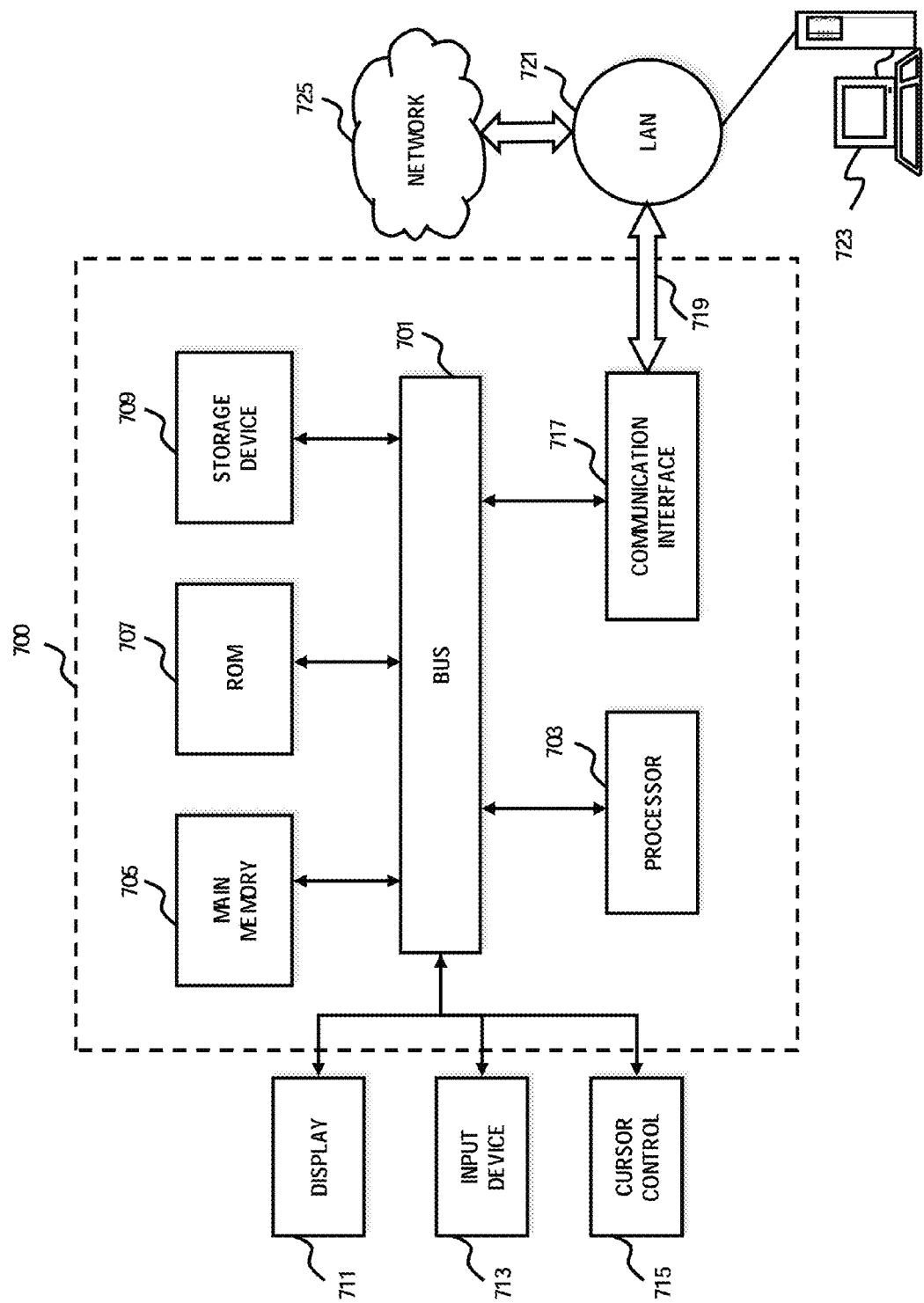
FIG. 7 is a diagram of a computer system that can be used to implement various exemplary embodiments.

FIG. 7 is a diagram of a computer system that can be used to implement various embodiments. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a light emitting diode (LED) or other flat panel displays, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711. Additionally, the display 711 can be touch enabled (i.e., capacitive or resistive) in order facilitate user input via touch or gestures.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a High Definition Multimedia Interface (HDMI), etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 such as a wide area network (WAN) or the Internet. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 1000 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Non-volatile media can further include flash drives, USB drives, microSD cards, etc. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

FIG. 8 illustrates a chip set 800 upon which an embodiment of the invention may be implemented. Chip set 800 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of the figures.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
assigning a diverse channel set to each of a plurality of diverse terminals, each diverse channel set including at least a forward channel from a primary gateway and a forward channel from a secondary gateway, the primary gateway and secondary gateway being part of a satellite communication system;
designating the primary gateway and secondary gateway, respectively, as a home gateway and a foreign gateway for a first set of diverse terminals from the plurality of diverse terminals;
designating the secondary gateway and primary gateway, respectively, as the home gateway and foreign gateway for a second set of diverse terminals from the plurality of diverse terminals;
enabling communication between each diverse terminal and its home gateway along the forward channel assigned from the home gateway;
monitoring link conditions between each diverse terminal and its home gateway or gateway with which it is currently enabled to communicate; and
reconfiguring any diverse terminal for communication with the foreign gateway or a gateway with which it is not currently enabled to communicate, based at least in part, on its link conditions falling below a predetermined threshold.

2. The method of claim 1, further comprising:
detecting a total or partial failure of the primary gateway or secondary gateway based, at least in part, on the monitoring link conditions;
reconfiguring all diverse terminals affected by the failure for communication with the primary gateway if the total or partial failure is detected at the secondary gateway; and
reconfiguring all diverse terminals affected by the failure for communication with the secondary gateway if the total or partial failure is detected at the primary gateway.

3. The method of claim 1, wherein assigning a diverse channel set comprises:
determining load metrics for the primary gateway channels and the secondary gateway channels; and
assigning a diverse channel set to each diverse terminal based, at least in part, on combined metrics of available channel sets for each diverse terminal.

4. The method of claim 1, further comprising:
designating at least one additional gateway as a home gateway for at least a third set of diverse terminals from the plurality of diverse terminals;
designating the at least one additional gateway as a foreign gateway for the first set of diverse terminals and the second set of diverse terminals; and
designating the primary gateway and the secondary gateway as foreign gateways for the at least third set of diverse terminals,
wherein the diverse channel set further includes at least one forward channel from the at least one additional gateway.

5. The method of claim 1, further comprising:
assigning a forward channel from the primary gateway to each of a first set of non-diverse terminals;
designating the primary gateway as a home gateway for the first set of non-diverse terminals;
assigning a forward channel from the secondary gateway to each of a second set of non-diverse terminals; and
designating the secondary gateway as a home gateway for the second set of non-diverse terminals,
wherein the non-diverse terminals are not associated with a foreign gateway.

6. The method of claim 1, wherein:
the primary gateway has a higher service capacity than the secondary gateway; and
the home gateway provides a higher quality of service to its assigned diverse terminals than the foreign gateway and/or other gateways.

7. The method of claim 1, further comprising:
a central network management system for maintaining information regarding all gateways and/or a local network management system associated with each gateway, wherein local network management systems are configured to exchange information with each other and/or the central management system.

8. The method of claim 1, wherein the reconfiguring further comprises:
transferring network session information from the home gateway or a gateway with which the diverse terminal was previously enabled to communicate to the foreign gateway or a gateway with which the diverse terminal is reconfigured to communicate,
wherein the network session information includes at least a root session key, unicast key version number, and volume usage fair access policy.

9. The method of claim 8, further comprising:
creating a new routing path to the reconfigured diverse terminal via the foreign gateway or the gateway with which the diverse terminal is reconfigured to communicate; and
advertising the new routing path at a lower cost than any previous routes to the reconfigured diverse terminal.

10. The method of claim 8, wherein all gateways receive multicast session information for the plurality of diverse terminals from an external network, and further comprising:
notifying the foreign gateway or the gateway with which the diverse terminal is reconfigured to communicate of any previous multicast sessions; and
transmitting, to the reconfigured diverse terminal, only multicast session information corresponding to previous multicast sessions.

11. The method of claim 1, further comprising:
determining if an imbalance exists between a load on the primary gateway and a load on the secondary gateway; and
rebalancing the loads between the primary gateway and the secondary gateway by reconfiguring at least one diverse terminal.

12. The method of claim 11, wherein determining if an imbalance exists further comprises:
monitoring oversubscription ratios of diverse terminals in the primary gateway and the secondary gateway in real-time;
comparing the oversubscription ratio of the primary gateway to the oversubscription ratio of the secondary gateway; and
concluding that an imbalance exists if the difference between the oversubscription ratios exceeds a predetermined threshold,
wherein the oversubscription ratio is based, at least in part, on the current number of diverse terminals currently configured to communicate with the gateway, the service plan of each diverse terminal, and capacity of the gateway.

13. The method of claim 12, wherein rebalancing the load further comprises:
selecting one or more diverse terminals to be moved from an oversubscribed gateway based on quality of service requirements;
estimating oversubscription ratios with the selected one or more diverse terminals configured to communicate with the undersubscribed gateway; and
moving the selected one or more diverse terminals to the undersubscribed gateway when the difference between the estimated oversubscription ratios is below the predetermined threshold.

14. A system comprising:
a plurality of diverse terminals;
a primary gateway configured to route traffic between the plurality of diverse terminals and one or more networks via a satellite, the primary gateway comprising:
a transceiver for transmitting/receiving data to/from the plurality of diverse terminals,
one or more ports for transmitting/receiving data to/from the one or more networks, and establishing a distinct point of connection with the one or more networks; and
at least one processor configured to:
assign a first forward channel to each of a first set of the diverse terminals, assign a second forward channel to each of a second set of the diverse terminals,
designate the primary gateway as a home gateway for the first set of diverse terminals,
designate the primary gateway as a foreign gateway for the second set of diverse terminals, and
enable communication with the first set of diverse terminals along the first forward channel; and
a secondary gateway configured to route traffic between the plurality of diverse terminals and the one or more networks via the satellite, the secondary gateway comprising:
a transceiver for transmitting/receiving data to/from the plurality of diverse terminals,
one or more ports for transmitting/receiving data to/from the one or more networks, and establishing a distinct point of connection with the one or more networks; and
at least one processor configured to:
assign a third forward channel to each of the first set of the diverse terminals,
assign a fourth forward channel to each of the second set of the diverse terminals,
designate the secondary gateway as a home gateway for the second set of diverse terminals,
designate the secondary gateway as a foreign gateway for the first set of diverse terminals, and
enable communication with the second set of diverse terminals along the third forward channel,
wherein the first forward channel and third forward channel define a diverse channel set for each of the first set of diverse terminals, and the second forward channel and fourth forward channel define a diverse channel set for each of the second set of diverse terminals, and
wherein each diverse terminal is configured to:
monitor link conditions with its home gateway or a gateway with which it is currently enabled to communicate, and
initiate communication with its foreign gateway or a gateway with which it is not currently enabled to communicate based, at least in part, on its link conditions falling below a predetermined threshold.

15. The system of claim 14, wherein:
the primary gateway's at least one processor is further configured to assign the first and second forward channels based, at least in part, on load metrics for the primary gateway forward channels and the secondary gateway forward channels; and
the secondary gateway's at least one processor is further configured to assign the third and fourth forward channels based, at least in part, on load metrics for the primary gateway forward channels and the secondary gateway forward channels.

16. The system of claim 14, further comprising:
a plurality of non-diverse terminals,
wherein the primary gateway's at least one processor is further configured to:
  assign a forward channel to each of a first set of the non-diverse terminals, and
  designate the primary gateway as a home gateway for the first set of non-diverse terminals,
wherein the secondary gateway's at least one processor is further configured to:
  assign a forward channel to each of a second set of the non-diverse terminals, and
  designate the secondary gateway as a home gateway for the second set of non-diverse terminals, and
wherein the non-diverse gateways are not associated with a foreign gateway.

17. The system of claim 14, further comprising:
a central network management system, a local network management system associated with the primary gateway, and/or a local network management system associated with the secondary gateway,
wherein the local network management systems are configured to exchange information with each other and/or the central management system.

18. The system of claim 15, wherein:
the primary gateway and secondary gateway are configured to transfer network session information for any diverse terminal switching from the primary or secondary gateway with which it was previously enabled to communicate to the primary or secondary gateway with which the diverse terminal is reconfigured to communicate;
the network session information includes at least a root session key, unicast key version number, and volume usage fair access policy; and
the diverse terminal's network session is maintained through any gateway switch.

19. The system of claim 14, wherein each gateway is configured to:
  determine if an imbalance exists between a load on the primary gateway and a load on the secondary gateway; and
  rebalance the loads between the primary gateway and the secondary gateway by reconfiguring at least one diverse terminal.

20. The system of claim 14, further comprising a third gateway configured to route traffic between the plurality of diverse terminals and the one or more networks, the third gateway comprising:
  a transceiver for transmitting/receiving data to/from the plurality of diverse terminals,
  one or more ports for transmitting/receiving data to/from the one or more networks, and establishing a distinct point of connection with the one or more networks; and
  at least one processor configured to:
    assign a fifth forward channel to each of a third set of the diverse terminals,
    assign a sixth forward channel to each of the first set of the diverse terminals,
    assign a seventh forward channel to each of the second set of the diverse terminals,
    designate the third gateway as a home gateway for the third set of diverse terminals,
    designate the third gateway as a foreign gateway for the first set of diverse terminals and the second set of diverse terminals,
    designate the primary gateway and the secondary gateway as foreign gateways for the third set of diverse terminals, and
    enable communication with the third set of diverse terminals along the fifth forward channel.

* * * * *